W. L. PADEN.
CASH REGISTER.
APPLICATION FILED OCT. 22, 1919.
1,396,277.
Patented Nov. 8, 1921.
2 SHEETS—SHEET 1.
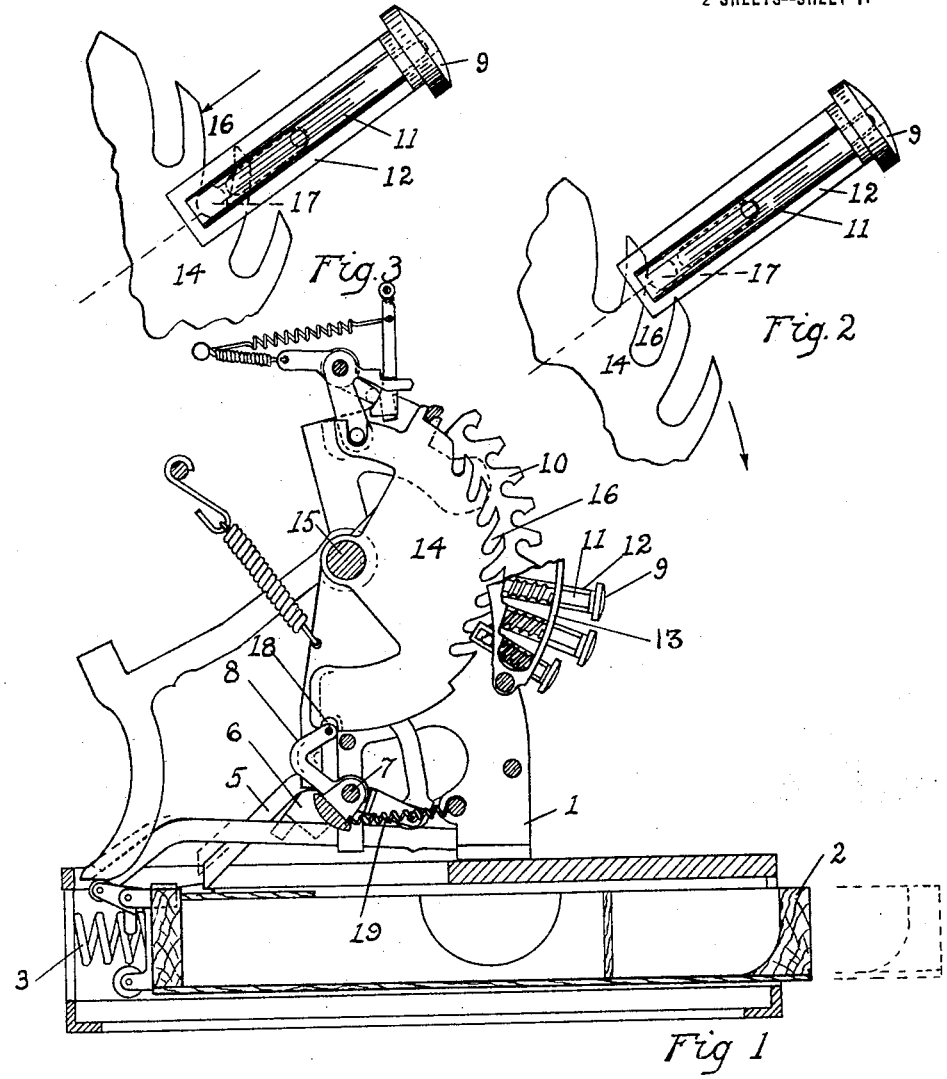
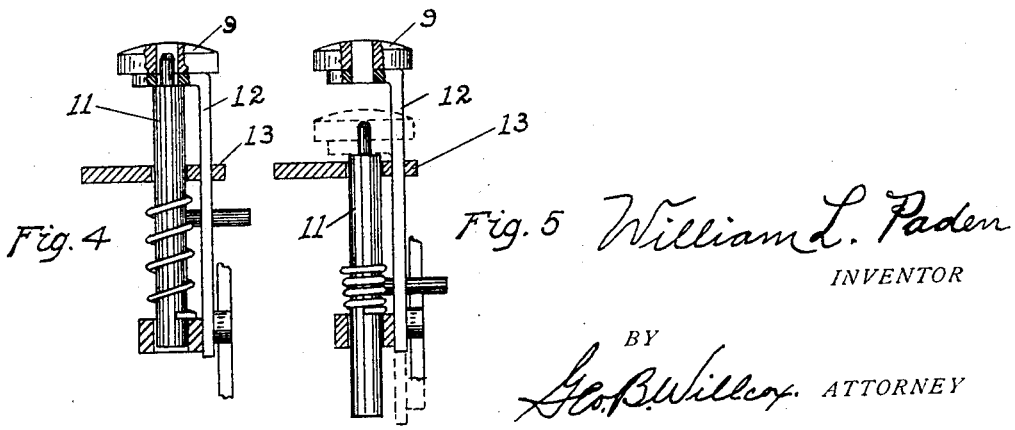
William L. Paden
INVENTOR
BY
Geo. B. Willcox, ATTORNEY

W. L. PADEN.
CASH REGISTER.
APPLICATION FILED OCT. 22, 1919.

1,396,277.

Patented Nov. 8, 1921.
2 SHEETS—SHEET 2.

INVENTOR
William L. Paden
BY
Geo. B. Willcox ATTORNEY

UNITED STATES PATENT OFFICE.

WILLIAM L. PADEN, OF SAGINAW, MICHIGAN, ASSIGNOR TO AMERICAN CASH REGISTER COMPANY, OF SAGINAW, MICHIGAN, A CORPORATION OF MICHIGAN.

CASH-REGISTER.

1,396,277.  Specification of Letters Patent.  Patented Nov. 8, 1921.

Application filed October 22, 1919. Serial No. 332,394.

*To all whom it may concern:*

Be it known that I, WILLIAM L. PADEN, a citizen of the United States, residing at Saginaw, in the county of Saginaw and State of Michigan, have invented certain new and useful Improvements in Cash-Registers; and I do hereby declare the following to be a full, clear, and exact description of the invention, such as will enable others skilled in the art to which it appertains to make and use the same.

This invention relates to registering machines and pertains more particularly to improvements in cash registers of the type adapted to indicate and record, by means of sets of keys, amounts of different denominations, and to actuate a cash drawer in conjunction with the registering mechanism.

A further purpose of my invention is to provide a simplified and improved means for actuating the cash drawer by utilizing for that purpose some of the same keys that are normally employed for recording the transaction. I thereby avoid manipulating a separate drawer-actuating key after the operator has depressed the keys that are required to be depressed to record the transaction.

This present improvement also includes a key mechanism whereby one key is made to perform functions which have heretofore been performed by two keys, namely, the recording of part of the transaction and the opening of the drawer.

With the foregoing and certain other objects in view, which will appear later in the specification, my invention comprises the devices described and claimed and the equivalents thereof.

In the drawings, Figure 1 is a vertical transverse part sectional view, broken away in part, showing such parts of a cash register as are associated in the operation of my improvement.

Fig. 2 is a side view of a double function key and part of the drawer-actuating plate operated thereby, the key being in its raised position.

Fig. 3 is a similar view of the same parts with the key depressed and the plate in the position it occupies when the drawer is being released.

Fig. 4 is a front view partly broken away, showing the combined recording and drawer release key in its raised position.

Fig. 5 is a similar view showing the drawer release member of the combined key in its raised position and the recording member in its depressed position, as it appears while the cash drawer is open.

In Fig. 6 the drawer 2 is shown closed, and in Fig. 7 open.

Figure 6:
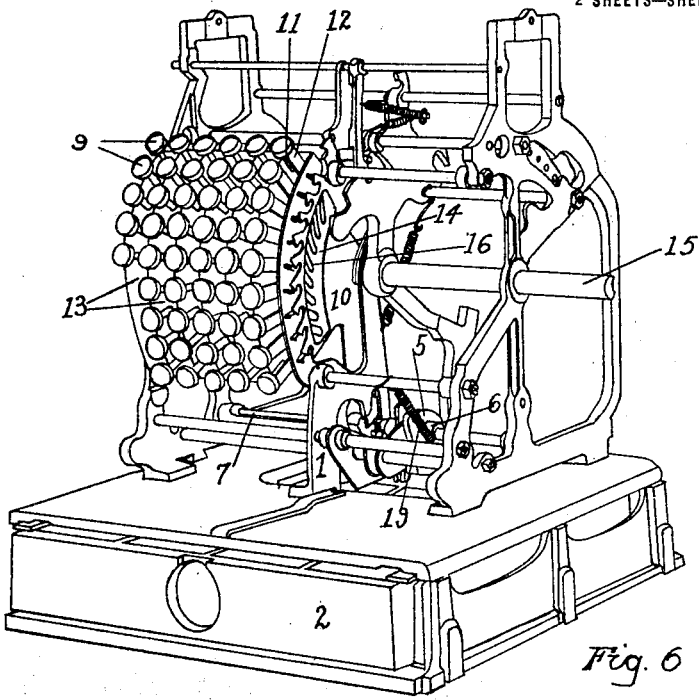
Figs. 6 and 7 are front elevations of a cash register embodying my improvement, the adding mechanism having been removed.
Figure 7:
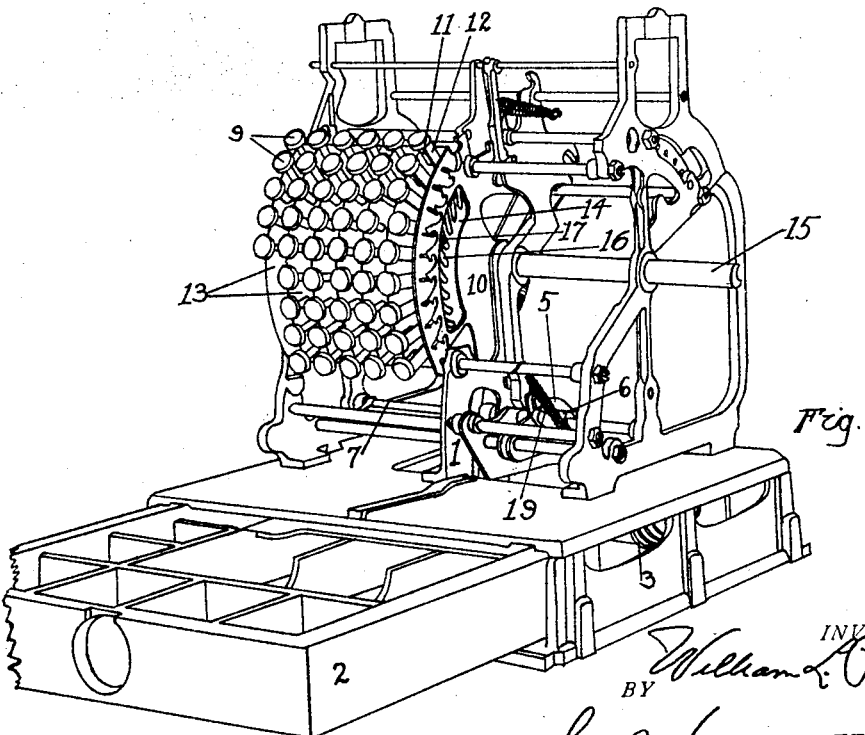

A preferred form of cash register to which my invention may be applied is a machine such as that shown in the patent to Hallwood, 1,085,681, Feb. 3, 1914, to which reference may be had.

The present drawings show the form of cash drawer and bank of keys similar to that described in the Hallwood patent, with my present invention applied thereto.

As is clearly shown in the drawing, the device consists in the usual cash register frame 1 with its cash drawer 2 which can be projected into open position by means of a spring 3, but is normally held in closed position by means of a drawer-retaining device preferably consisting of a latch, as 5, pivotally mounted on the frame 1 and adapted to be raised as indicated by the dotted lines in Fig. 1, thereby releasing the drawer, which is thereupon projected into its open position by the spring 3.

The latch 5 is usually actuated by means of a lifting cam 6 carried by a rock-shaft 7 which is rocked by a lever 8 actuated by the release key and its associated mechanism comprising the subject-matter of my present improvement.

9 is any one of the set of keys which is capable of recording either an amount or a description of the character of the transaction or the initial of the clerk or the name of a department, but in my improved device this key, upon being depressed, performs in addition to this usual recording function, the further function of a drawer-release key, so that when the key 9 is depressed it will not only record, but also unlatch the cash drawer and permits it to open. The key 9 is preferably made in two parts, each part operating independently, one to record and the other to release the drawer, but both parts are actuated by a single push of the operator's finger.

The recording function of the key is preferably performed by the same means and in the same way as it is performed in cash registers of ordinary construction, namely, by manipulation of the usual key lock plate 10 and its connected mechanism.

Since the recording mechanism actuated by the key 9 and its lock plate 10 do not constitute a part of my present invention, detailed description thereof will be omitted, it being understood that the same recording function is performed by key stem 11 that would have been performed by it if my improved drawer-release device had not been applied thereto. It will also be understood that the mechanism connected with stem 11 is in practice such that upon depressing stem 11 a proper record is thereby entered in the machine. When once depressed, stem 11 will remain depressed until the cash drawer has opened and has again been closed. Upon closing the cash drawer the stem 11 will return to its initial position.

In applying my invention in its preferred form, I mount the key 9 on a slidable shank 12 that moves in proximity to and parallel with the stem 11, as shown in Figs. 4 and 5 and preferably in such manner that the key 9 when depressed will not only push in shank 12, but also stem 11.

The closing of the drawer first releases the drawer-releasing part of the key, i. e. shank 12 and permits it to return to its original position, which is the position shown in Figs. 2 and 4, and then releases the recording part of the key, i. e. the stem 11, which resumes its raised position. In Fig. 5 I have shown by full lines the normal or raised position of the drawer releasing part of the key and the depressed position of the recording part.

The shank 12 slides through an opening in the key-bearing frame 13, as does stem 11.

Mechanical connection is provided between the shank 12 and the lever 8, whereby the lengthwise movement of the shank is made to communicate a rocking movement to lever 8 to release the drawer-retaining device.

This result may be accomplished by a variety of mechanisms included within the scope of my claims, but I prefer in practice the construction shown in the drawings, in which 14 is a cash drawer release-plate carried by a bar 15 which is mounted on the frame of the machine, the plate 14 having a slight oscillating movement, as indicated by the dotted lines in Fig. 1.

The periphery of plate 14 is provided with angularly disposed guide-ways or recesses 16, or their equivalents which are adapted to be slidingly engaged by a laterally projecting pin or lug 17 carried by the shank 12.

When the key 9 is depressed, the pin 17 oscillates plate 14 and this plate in turn moves the lever 8, the end of which may be received in a recess 18 of the plate.

Similarly any other of the keys 9 will oscillate the plate 14 and thereby release the drawer, there being as many guideways or recesses 16 in the plate as there are keys in the vertical row alined with plate 14.

After a key as 9 has been depressed it is returned to its original position by the plate 14 which in turn is yieldingly restored to its normal or initial position by means of a spring 19, or its equivalent. Spring 19 rocks shaft 7 and lever 8 in the reverse direction, that is, in the direction of the arrow in Fig. 2.

The curved guideway 16 thereby operates as a cam to push the key 9 outward and restore it to its original position.

Having thus described my invention, what I claim and desire to secure by Letters Patent is:

1. In a registering machine, a series of recording keys, a drawer, a releasable drawer-retaining device, means adapted to open said drawer when released and means for releasing said drawer-retaining device, said means comprising a drawer-release key operatively connected to said drawer-retaining device, said release key adapted upon being depressed to automatically engage and depress one of said recording keys, for the purposes set forth.

2. In a registering machine, a combined recording and drawer release device including a key comprising two stems, one of said stems adapted to actuate the recording device of said machine, said stems adapted to be depressed simultaneously and to return independently to their initial positions for the purposes set forth.

In testimony whereof I affix my signature.

WILLIAM L. PADEN.

Correction in Letters Patent No. 1,396,277.

It is hereby certified that the name of the assignee in Letters Patent No. 1,396,277, granted November 8, 1921, upon the application of William L. Paden, of Saginaw, Michigan, for an improvement in "Cash-Registers," was erroneously written and printed as "American Cash Register Company, of Saginaw, Michigan, a Corporation of Michigan," whereas said name should have been written and printed as *American Cash Register Company, of Saginaw, Michigan, a Corporation doing business in the State of Michigan*, as shown by the records of assignments in this office; and that the said Letters Patent should be read with this correction therein that the same may conform to the record of the case in the Patent Office.

Signed and sealed this 31st day of January, A. D., 1922.

[SEAL.]

WM. A. KINNAN,

*Acting Commissioner of Patents.*